United States Patent
Douglas et al.

(10) Patent No.: US 9,678,507 B1
(45) Date of Patent: Jun. 13, 2017

(54) AUTONOMOUS INFRASTRUCTURE ELEMENT SURVEY SYSTEMS AND METHODS USING UAV FLEET DEPLOYMENT

(71) Applicant: Latitude Engineering, LLC, Tucson, AZ (US)

(72) Inventors: Jason Douglas, Tucson, AZ (US); Travis Alexander Woodrow, Tucson, AZ (US); Manu Singh, Tucson, AZ (US); Michael Aeko Balthazar, Tucson, AZ (US)

(73) Assignee: LATITUDE ENGINEERING, LLC, Tucson, AZ (US)

( * ) Notice: Subject to any disclaimer, the term of this patent is extended or adjusted under 35 U.S.C. 154(b) by 0 days.

(21) Appl. No.: 14/751,072

(22) Filed: Jun. 25, 2015

(51) Int. Cl.
G05D 1/00 (2006.01)
G08G 5/00 (2006.01)
G05D 1/10 (2006.01)

(52) U.S. Cl.
CPC .......... *G05D 1/0027* (2013.01); *G05D 1/104* (2013.01); *G08G 5/003* (2013.01); *G08G 5/0013* (2013.01); *G08G 5/0034* (2013.01); *G08G 5/0069* (2013.01)

(58) Field of Classification Search
CPC .. G08G 5/0013; G08G 5/0034; G08G 5/0043; G08G 5/0069; G08G 5/003; G05D 1/0027; G05D 1/104; B64C 2201/086; B64C 2201/187
See application file for complete search history.

(56) References Cited

U.S. PATENT DOCUMENTS

| 8,935,035 B1* | 1/2015 | Bogdanowicz | .......... G08G 1/20 701/26 |
| 9,162,753 B1* | 10/2015 | Panto | ............... B64C 19/00 |
| 2011/0264311 A1* | 10/2011 | Lee | ............. H04N 7/183 701/15 |
| 2011/0320068 A1* | 12/2011 | Lee | ............. G05D 1/0016 701/2 |
| 2012/0210853 A1* | 8/2012 | Abershitz | ............ B64F 1/04 89/1.11 |

(Continued)

OTHER PUBLICATIONS

Godzdanker, Roy, "An integrated platform to increase the range/endurance of unmanned helicopters", Ph.D. Thesis, University of Denver, Nov. 2011, 145 pages (published in 2012 by UMI Dissertation Publishing, UMI No. 3491091).*

(Continued)

*Primary Examiner* — Behrang Badii
*Assistant Examiner* — David Testardi
(74) *Attorney, Agent, or Firm* — Sheppard, Mullin, Richter & Hampton LLP

(57) ABSTRACT

An unmanned aerial vehicle (UAV) survey system and methods for surveying an area of interest are disclosed. The system can include a plurality of docking stations positioned at predetermined locations within the area of interest, each docking station comprising a platform to support a UAV while docked at the docking station; a battery charger; and a communications interface; a plurality of UAVs distributed among the plurality of docking stations, each UAV comprising a communications interface; and a system controller comprising a processor and transmitter communicatively coupled to the plurality of UAVs.

23 Claims, 10 Drawing Sheets

(56) References Cited

U.S. PATENT DOCUMENTS

| | | | | |
|---|---|---|---|---|
| 2014/0124621 | A1* | 5/2014 | Godzdanker | B64F 1/125 244/110 E |
| 2014/0129059 | A1* | 5/2014 | Scarlatti | G05D 1/00 701/16 |
| 2015/0066248 | A1* | 3/2015 | Arbeit | G01C 21/20 701/2 |
| 2015/0336669 | A1* | 11/2015 | Kantor | G01C 21/20 701/3 |
| 2016/0009413 | A1* | 1/2016 | Lee | B64F 1/007 701/16 |

OTHER PUBLICATIONS

Kim, Jonghoe et al., "On the Scheduling of Systems of UAVs and Fuel Service Stations for Long-Term Mission Fulfillment", Journal of Intelligent and Robotic Systems, vol. 70, Issue 1-4, Apr. 2013, pp. 347-359.*

Song, Byung Duk et al., "Persistent UAV Service: An Improved Scheduling Formulation and Prototypes of System Components", Journal of Intelligent and Robotic Systems, vol. 74, Issue 1, Apr. 2014, pp. 221-232.*

SUAS News, "Why BNSF Railway is using drones to inspect thousands of miles or rail lines", by David Z. Morris, Jun. 8, 2015, 5 pages.*

Mulgaonkar, Yash, "Automated recharging for persistence missions with multiple micro aerial vehicles" Master's Thesis, University of Pennsylvania, 2012, 44 pages.*

\* cited by examiner

US 9,678,507 B1

AUTONOMOUS INFRASTRUCTURE ELEMENT SURVEY SYSTEMS AND METHODS USING UAV FLEET DEPLOYMENT

TECHNICAL FIELD

The disclosed technology relates generally to unmanned aerial vehicles (UAVs), and more particularly, some embodiments relate to systems and methods for deploying UAVs for survey missions.

DESCRIPTION OF THE RELATED ART

Manned aircraft of various kinds have long been used to conduct aerial-survey operations including, for example, exploration, observation, investigation, inspection and monitoring of ground-based systems or areas. This is true in both the military and non-military context. Aerial surveys can include, for example, operations such as crop mapping; inspection of power, gas, and rail lines; reconnaissance operations; area or event monitoring, and other infrastructure inspection and monitoring for determined areas of responsibility.

Aerial survey operations have also been performed by unmanned aerial vehicles (UAVs), also referred to at times as drones, which are aircraft configured to fly without a pilot on board. UAV flights are typically controlled by computer or by a navigator or pilot at a remote location. For example, the pilot can control the aircraft from a command center on the ground or even from another vehicle. Because the pilot is not onboard the aircraft, drones can typically be made smaller and lighter weight than conventional aircraft, but can suffer from limited range and reduced speed.

With conventional systems manned aircraft have often been deemed the better choice for non-military aerial surveys because, although a manned aircraft can involve a higher initial capital outlay, manned aircraft can typically travel a greater speeds, thus covering more ground in a shorter period of time. As a result of this speed differential, pilot costs for manned aircraft can be substantially less than pilot costs for a UAV. Additionally, conventional manned aircraft can typically cover greater distances and remain in the air longer than conventional, low-cost UAVs.

BRIEF SUMMARY OF EMBODIMENTS

According to various embodiments of the disclosed technology, systems and methods can be provided to conduct aerial surveys, such as aerial infrastructure inspection and monitoring, using a fleet of unmanned aerial vehicles (UAVs). In various embodiments, a fleet of multiple autonomous, or relatively highly automated UAVs can be configured so that each UAV in the fleet is configured to conduct an aerial survey of its respective defined area of responsibility. More particularly, in some embodiments, an infrastructure element to be inspected and monitored can be divided into a plurality of zones, segments, or other sectors. Each UAV in the fleet can be designated to cover a given sector such that all of the sectors in the area of responsibility are covered by one or more UAVs in the fleet.

In various embodiments, the fleet of UAVs is controlled by a central server or other controller (sometimes referred to as a fleet controller) such that one control system can cover more than one aircraft. Indeed, in some embodiments, a single controller can control all of the UAVs in the fleet for the infrastructure element. As a result of such configurations, systems can be implemented in such a way that the conventional link of one pilot to one aircraft can be broken, allowing efficiencies and system operation to be gained. Dividing an area of responsibility into multiple sectors and dividing the survey responsibility for those sectors among multiple UAVs, lowers the range and speed-of-coverage requirements on the aircraft. This reduction in speed and range requirement generally allows a lower-cost aircraft to be implemented to cover the reduced area/range of the defined sector (low-speed, low-range UAVs generally being less expensive than manned aircraft conventionally used for similar surveys). Also, using UAVs as opposed to manned aircraft allows for a smaller, lighter weight and more fuel-efficient aircraft as compared to conventional manned aircraft. Moreover, embodiments can be configured for highly automated flight, allowing one pilot to control multiple aircraft simultaneously. In some embodiments, full automation can be obtained.

In further embodiments, an unmanned aerial vehicle (UAV) survey system and methods for surveying an area of interest are disclosed. The system can include a plurality of docking stations positioned at predetermined locations within the area of interest, each docking station comprising a platform to support a UAV while docked at the docking station; a battery charger; and a communications interface; a plurality of UAVs distributed among the plurality of docking stations, each UAV comprising a communications interface; and a system controller comprising a processor and transmitter communicatively coupled to the plurality of UAVs.

The method can include a method of surveying an area of interest with a fleet of UAVs deployed to a plurality of docking stations positioned at predetermined locations within the area of interest. The method can further include programming each of the plurality of UAVs with a survey mission comprising survey mission parameters and a flight path, wherein the area of interest is divided into a plurality of sectors that are smaller than the area of interest, and the programming comprises programming each UAV of the plurality of UAVs to follow a flight path to survey a first sector of the area of interest that is different from the sectors surveyed by the other UAVs of the plurality of UAVs; each of the plurality of UAVs performing its programmed survey mission for its respective first sector.

The programmed survey mission for each UAV can include: the UAV departing from a first docking station; the UAV following its programmed flight path along its first sector of the area of interest; the UAV using sensors to gather sensor data along the UAV's programmed flight path; and the UAV landing at a terminating docking station; the UAV transferring sensor data gathered during the mission; wherein as a result of the plurality of UAVs each surveying a different sector of the area of interest, the area of interest is surveyed by the combined operations of the plurality of UAVs.

In some embodiments the terminating docking station for a given UAV of the plurality of UAVs is the first docking station while in other embodiments, the terminating docking station for each of the plurality of UAVs is a docking station within the area of interest that is a different docking station different from the first docking station.

Each of the plurality of UAVs may perform a subsequent survey mission in which each UAV of the plurality of UAVs surveys a second sector of the area of interest that is different from the sectors surveyed by the other UAVs of the plurality of UAVs in the subsequent survey mission. The subsequent survey mission for each UAV can include: the UAV departing from the docking station at which it its prior survey mission terminated; the UAV following a second programmed flight path along its second sector of the area of interest; the UAV using sensors to gather sensor data along the UAV's second programmed flight path; the UAV landing at a second terminating docking station; and the UAV transferring sensor data gathered during the mission.

In further embodiments, each of the plurality of UAVs may perform a subsequent survey mission in which each UAV of the plurality of UAVs surveys its assigned first sector of the area of interest. The subsequent survey mission for each UAV can include: the UAV departing from the docking station at which it its prior survey mission terminated; the UAV following a second programmed flight path along its first sector of the area of interest toward the first docking station; the UAV using sensors to gather sensor data along the UAV's first programmed flight path; the UAV landing at the first docking station; and the UAV transferring sensor data gathered during the subsequent survey mission.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
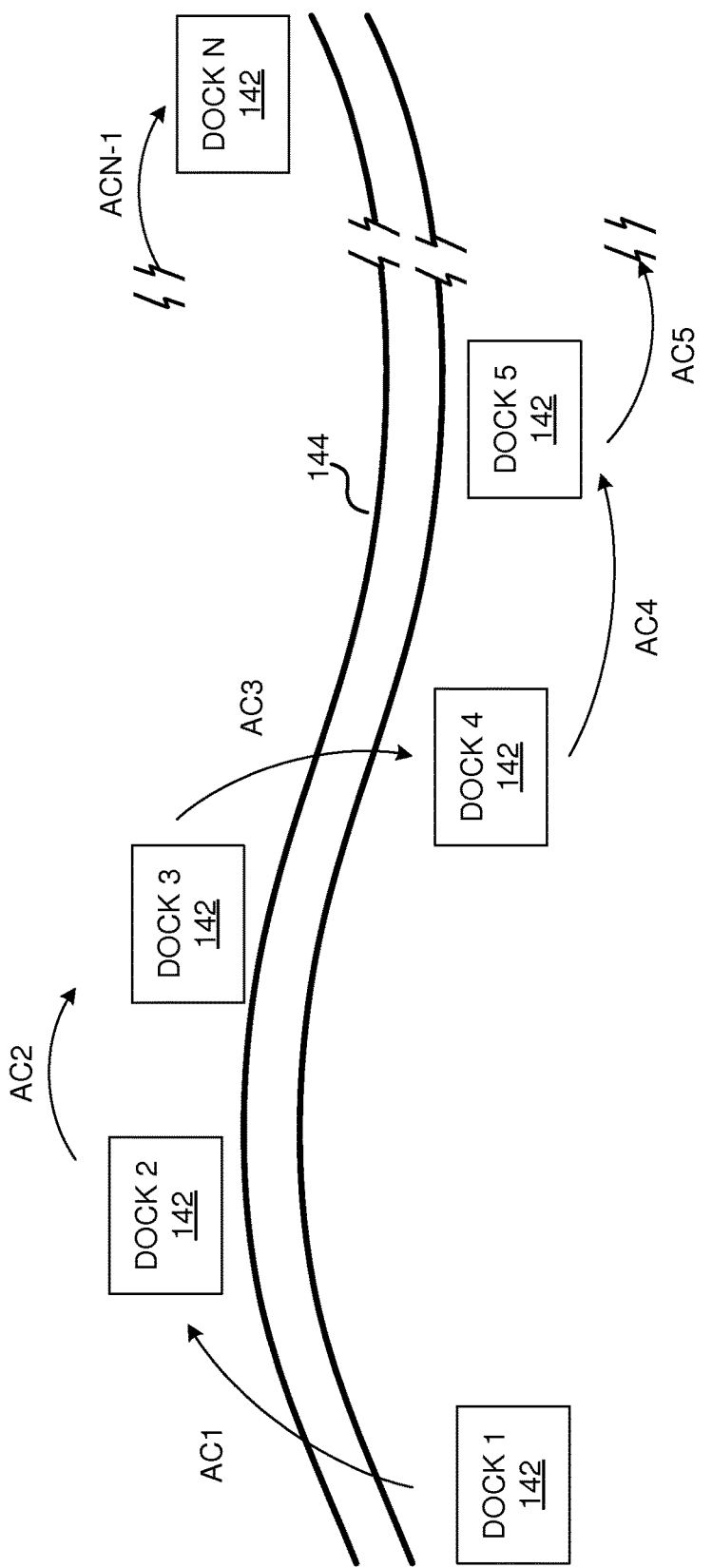
FIG. 1 is a diagram illustrating an example implementation of an automated fleet of small, unmanned aerial vehicles for aerial surveys in accordance with one embodiment of the systems and methods described herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward unmanned aircraft systems, including aircraft, ground stations, payloads (including cameras and other sensor packages), communications systems, and so on for surveying (including inspecting and monitoring) various areas of interest. According to various embodiments of the disclosed technology, systems and methods can be provided to conduct aerial surveys, such as aerial infrastructure inspection and monitoring, using a fleet of unmanned aerial vehicles (UAVs) to perform missions along designated flightpaths.

Implementations can be configured that divide infrastructure elements into a plurality of different sectors, such that subsets of the entire defined infrastructure element can be inspected or monitored using multiple UAVs as opposed to a single manned aircraft. Because each UAV has less area to cover per flight, the UAVs are not required to have the same performance characteristics (e.g., range and speed) that would otherwise be required of a single manned aircraft designed to cover the entire infrastructure element. Therefore, embodiments implement a fleet of multiple autonomous, or relatively highly autonomous UAVs that are configured so that each UAV in the fleet can conduct an aerial survey of its respective defined sector within in a larger area of responsibility. Each UAV in the fleet can be designated to cover a given sector such that all of the sectors in the area of responsibility are covered by one or more UAVs in the fleet.

In various embodiments, the fleet of UAVs is controlled by a central server or other central controller such that one control system can cover more than one aircraft. Indeed, in some embodiments, a single central controller can control all of the UAVs in the fleet. As a result of such configurations, systems can be implemented in such a way that the conventional link of one pilot to one aircraft can be broken, allowing efficiencies of system operation to be gained. Dividing an area of responsibility into multiple sectors and dividing the survey responsibility for those sectors among multiple UAVs, lowers the range and speed-of-coverage requirements on the aircraft. This reduction in speed and range requirement generally allows a lower-cost aircraft to be implemented to cover the reduced area/range of the defined sector (low-speed, low-range UAVs generally being less expensive than manned aircraft conventionally used for similar surveys). Also, using UAVs as opposed to manned aircraft allows for a smaller, lighter weight and more fuel-efficient aircraft as compared to conventional manned aircraft. This can have the added benefit of providing safer operation for persons in the air and on the ground.

Embodiments of the systems and methods disclosed herein are configured to include a plurality of ground elements, or docking stations, spaced within the area to be surveyed. These ground elements can be configured to provide a platform or hanger like element from which the UAVs can be deployed and that which they can be landed. The ground elements, or docking stations, can also include battery chargers to charge the UAVs between flights and to maintain the charge during non-flight periods, and communications interfaces to communicate with the UAVs and to relay communications between the UAVs and other external entities. The ground elements can also be configured to provide shelter and security for the UAVs. That is the ground elements can be built as hangar-like structures to provide shelter from the weather and they can include doors to protect the UAVs from tampering or theft. In some embodiments, the ground elements can be built as raised platforms to further reduce the risk of tampering or theft.

In some embodiments, the ground elements can be dedicated ground elements distributed about the area of interest. In the case of ground elements mounted on a raised platform, dedicated raised platforms or other elevated structures can be constructed to support the ground elements in a secure location above the ground. In other embodiments, the ground elements are constructed as part of other elements along the area of interest such as, for example, warehouses, maintenance buildings, and other facilities; or other boxes and enclosures that serve other functions for the infrastructure element to be surveyed such as, for example, existing power and communication boxes for the infrastructure element (e.g., signal or switching boxes in the case of rail lines); light, power or communications towers or poles; and so on.

Before describing components of the invention in further detail, it is useful to first describe an example of embodiments of the systems and methods disclosed herein in terms of an example application. More particularly, embodiments of the systems and methods disclosed herein are now described in terms of an aerial survey for a linear infrastructure element such as, for example, a rail, gas, or powerline, a canal or other waterway, a roadway, or other like generally linear area to be surveyed. For ease of the discussion, the linear infrastructure element is described in terms of an example rail line or railway. Discussion of the systems and methods in terms of this example application will provide context for a more detailed discussion of such systems and methods in later portions of this disclosure. As one of ordinary skill in the art will appreciate, rail lines, canals or waterways, roadways, and other linear infrastructure elements are not necessarily arranged in a straight line. Accordingly, the term "linear" is not intended to be limited to an arrangement or configuration in a straight or nearly straight line. Instead the term is used at times herein to refer to infrastructure elements that tend to follow a path or line, just not necessarily a straight path or line.

FIG. 1 is a diagram illustrating an example implementation of an automated fleet of small, unmanned aerial vehicles for aerial surveys. In particular, the example disclosed in FIG. 1 includes a network of UAVs, AC1-ACN-1, and a plurality of N ground elements or docking stations 142 to support the network of UAVs. Further in this example, docking stations 142 are distributed about the linear infrastructure element, which as noted above in this example is assumed to be a rail line 144.

Also shown in the example of FIG. 1 is a system controller 146 which can be a central system controller such as, for example, a server system located at a base of operations to control the operation of the network of UAVs. In other embodiments, system controller 146 can be a distributed system of controllers to provide this operational control. System controller 146 can include hard wired and wireless communications to allow remote control of the UAVs in the fleet as well as to exchange $C^3$ (Command, Control and Communications) information, telemetry and other data and information with the docking stations or the UAVs (either directly or by way of a communication relay through docking stations). For example, the system controller can be configured to download mission parameters and other mission information to the UAVs, provide remote control for UAV flight operations, receive telemetry from the UAVs, retrieve data gathered by the UAVs during their flight missions, provide software or other updates to the UAVs and the docking stations, and otherwise exchange other information with the docking stations and UAVs.

In this example, assume that it is desired to inspect rail line 144 on a periodic basis using aircraft flying along the rail line so that a visual and a non-visual sensor-aided inspection can be made. In various embodiments and as shown in the diagram, docking stations 142 are distributed at spaced-apart intervals along the rail line 144. Docking stations 142 are populated with one or more UAVs in each station so that the aircraft can be staged from their respective docking stations 142 for a given mission.

When a survey mission is initiated, an aerial vehicle leaves its docking station 142, flies in a pattern (e.g., preprogrammed as part of a mission or controlled in real-time based on what is discovered during flight) within its range of its docking station 142, gathers data using its sensor package, and returns to its docking station for recharging or refueling. Accordingly, in this configuration, UAVs AC can remain stationed at their respective docking stations and perform out-and-back missions without landing at a different docking station.

In other embodiments, the UAVs can conduct a survey missions while flying from one docking station to the next along the infrastructure element. For example, when a mission is initiated, an aerial vehicle leaves its docking station 142, flies along its intended route to gather data, and terminates its mission at the next docking station 142. For example, in the illustrated example UAV AC1 is staged at Dock 1, departs dock 1 upon initiation of the mission to inspect the rail line 144 between Dock 1 and Dock 2 and terminates the mission at Dock 2. Upon docking, the UAV AC1 can be refueled or recharged at Dock 2 docking station 142 and it can also download image data and other sensor data for review and inspection. For the next mission, the UAV may be programmed to return to its original docking station 142 (e.g., UAV AC1 surveys the sector between Dock 1 and Dock 2 and returns to Dock 1) at the conclusion of its mission. Alternatively, for the next mission, the UAV may be programmed to continue surveying another sector (e.g., the next adjacent sector) down the line. For example, UAV AC1 may depart Dock 2 and survey the sector between Dock 2 and Dock 3 and terminates its mission at Dock 3.

As also shown in the example of FIG. 1, the other aircraft in the fleet staged at their respective docking stations 142 are also deployed to inspect the rail line 144 each between their respective initiating and terminating docking stations 142. That is UAV AC2 is staged at Dock 2, inspects the rail line 144 between Dock 2 and Dock 3 and terminates the mission at Dock 3 and so on until the last segment of the rail line in this survey is inspected by UAV AVN-1 which departs from dock N-1 and terminates at Dock N. In various embodiments, UAVs AC1 through AVN-1 can be deployed one at a time in a serial fashion or some or all of them can be deployed simultaneously to perform their inspections. Once all of the UAVs AC1 through AVN-1 have made flight from their respective initiating to their terminating docking stations 142, the entire infrastructure element between Dock 1 and Dock N has been surveyed.

For a subsequent survey, the mission can be flown in reverse such that each UAV flies the mission from its current docking station (where the last mission terminated) to its original initiating docking station. In this way, each UAV can be dedicated to survey particular sector of the infrastructure element between two docking stations 142. This can be advantageous in situations where different UAV requirements may be specified for different sectors of the infrastructure element to be surveyed. For example, different sectors of the infrastructure element may be at altitudes that are sufficiently different from one another that it would be advantageous to have different aircraft configured to handle the unique altitude requirements. As another example, different sectors of the infrastructure element may have different inspection and monitoring requirements such that different sensor packages can be included for the aircraft in different sectors.

As noted above, in some configurations, after the rail-line survey is complete, the direction of travel can be reversed for the next survey. In other configurations, additional UAVs can be stationed at the system entry point (e.g. Dock 1) and the next survey completed in the same direction with the UAVs continuing to hop down the line from one docking station 142 to the next for each survey. As this example serves to illustrate, a fleet of UAVs can be used to inspect a rail line or other linear infrastructure element by sequentially hopping from one docking station to the next and performing sensor operations to gather sensor data. Although the example described above illustrates a sequential hopping from one end of the infrastructure element to the other, alternative flight arrangements between docking stations can be configured.

Figure 2:
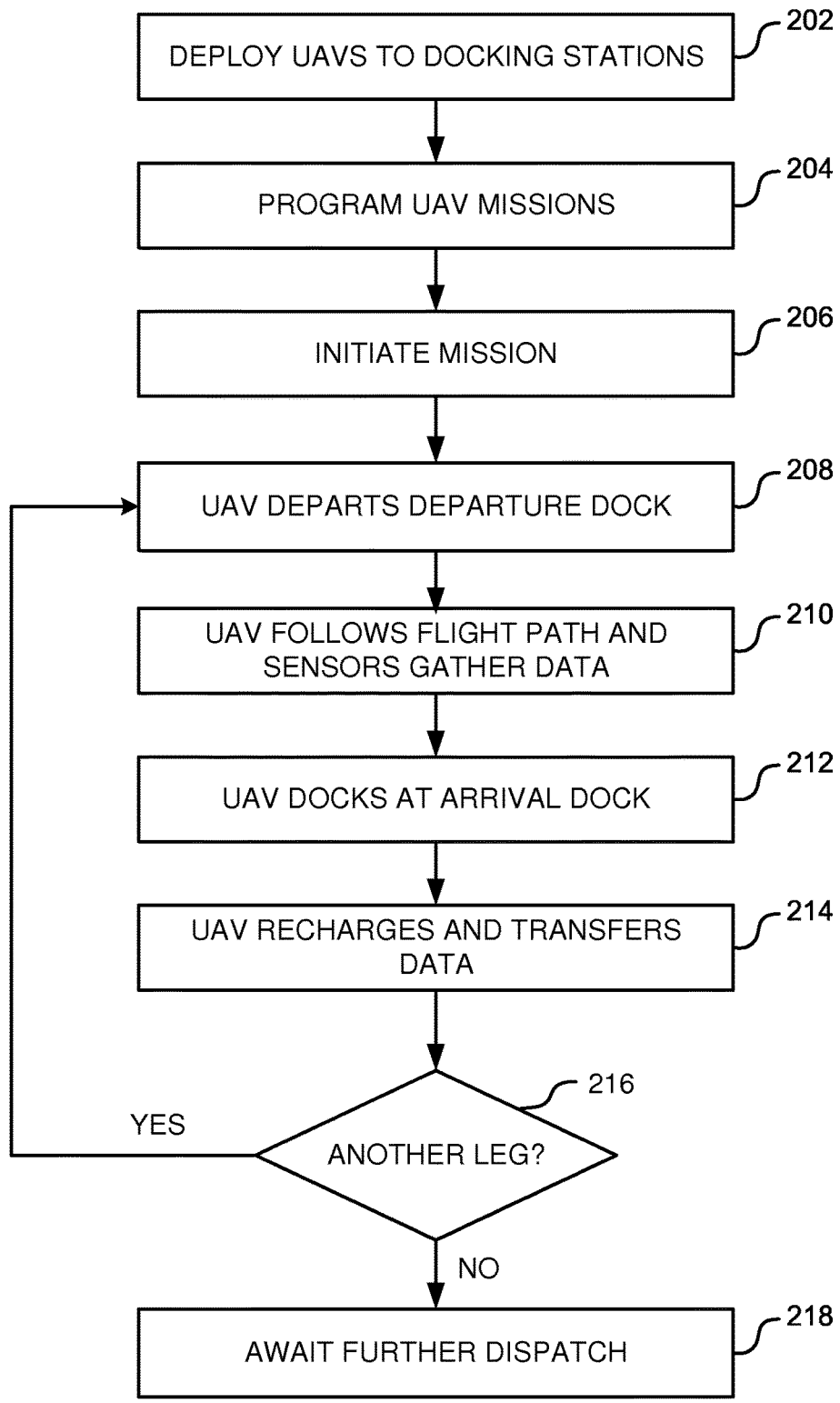
FIG. 2 is a diagram illustrating an example process for operating an infrastructure inspection and monitoring mission in accordance with one embodiment of the technology described herein.

FIG. 2 is a diagram illustrating an example process for operating an infrastructure inspection and monitoring mission in accordance with one embodiment of the technology described herein. Referring now to FIG. 2, at operation 202 UAVs are deployed to their respective ground elements or docking stations. In one embodiment, the UAVs can each be delivered to their respective docking station by hand delivery. In another embodiment, the UAVs can be delivered to a docking station configured as a system entry point, and distributed from the entry point to their respective docking stations. For example, in terms of the example illustrated in FIG. 1, Dock 1 can be the system entry point, and a plurality of UAVs can be delivered to Dock 1 and flown up the line to the remaining docking stations. As another example, a centrally located docking station can be identified as the system entry point and a plurality of UAVs delivered to the centrally located docking station. Each UAV can then be flown up or down the line to its respective home or initial docking station. For lengthy rail lines or other areas of responsibility, more than one docking station can be designated as an entry point to the network. In such a scenario, UAVs can be delivered to each of the multiple entry-point docking stations and distributed to their respective initial docking stations from there. For convenience or ease of operation, the system entry point can be a docking station that is located to provide convenient access by maintenance personnel, or may be near a warehouse or other maintenance facilities.

In some embodiments, the UAVs can also be loaded with mission parameters and other mission information prior to deployment. In other embodiments, the UAVs can be loaded with mission parameters and other mission information via communication links (wired or wireless communication links) while in their docking stations. Mission parameters or other information can be updated and downloaded to the UAVs in their docking stations. Additionally, flight control software can be updated while the UAVs are in their docking stations. The UAVs can also receive updated flight plan information and other mission parameters and information while in flight. However there may be flight patterns for which the aircraft intentionally flies out of communications range of the docking station or communications site (e.g., system controller 146).

At operation 204 the survey mission is determined and can be programmed into the system. For example, the survey mission can be defined and the mission parameters entered into system controller 146. This can be via direct entry into system controller 146 through human operator, or via a download of mission parameters from a remote system entity. Mission parameters for an identified survey mission can include, for example, locations of the docking stations in the survey area, identification of a subset of docking stations included in a mission, flight paths between identified docking station pairs, flight altitude and speed along the flight paths, sensor utilization along the flight path, camera angles, mission start times or intervals, data collection and communication requirements, and so on.

At operation 206 a mission is initiated. In some embodiments, the mission can be initiated based on a timer. For example, missions can be programmed to begin on certain dates and times and a system clock used to initiate the mission. The system clock can be maintained at a central server (e.g. system controller 146) and a signal sent from the central server to the UAVs, for example via their respective docking stations, to initiate a mission. In other embodiments, distributed clocks are maintained at the docking stations or at the UAVs, and the missions initiated based on those clocks. In other embodiments, countdown timers can be used to initiate a mission as opposed to a date/time clock. In yet other embodiments, missions may be initiated based on the occurrence of certain conditions. For example, external or environmental factors such as weather events (e.g., storms, out of bounds temperature conditions, or the occurrence of other predetermined weather conditions or external events), reporting of accidents on the line, out-of-bounds line conditions (e.g., high pressure in a gas line, over-current on a power line, etc.), or other events can trigger initiation of a mission.

At operation 208, upon initiation of the mission a UAV departs from its respective docking station. The UAV follows its designated flightpath, gathers sensor data and docks at its designated arrival docking station where it can be recharged and the data collected can be transferred. This is illustrated at operations 210 through 214. If the mission involves flying another leg, the operation continues as illustrated at operation 216. When the mission is completed for each UAV, the UAV can remain at the docking station and await further dispatch as illustrated at operation 218. While docked at the docking station, the UAV can continue to charge its batteries and communicate with the docking station or with other external entities.

Operations 208 through 214 are now described in terms of the example system illustrated in FIG. 1. In this example, UAV AC1 departs from Dock 1 and, according to its programmed mission, follows rail line 144 toward Dock 2. During its flight along its designated flightpath, the appropriate sensors are engaged to gather data defined for the mission. For example, cameras can be used to gather image information that can later be inspected by a human inspector or by image processing software to check the condition of rail line 144 and to look for any anomalies that may exist. As another example, infrared sensors can be used to check for temperature variations and hot or cold spots along the infrastructure element. For example, hotspots along a power line may indicate an area of increased resistance that requires attention. As yet another example, LiDAR (Light Detection and Ranging), or other like sensors can be used to perform distance measurement and mapping to look for unwanted topographical changes such as, for example, washouts along the rail line. As these examples serve to illustrate any of a number of sensors can be used depending on the objectives of the mission. Image processing and computer vision techniques can be employed in real-time or as post processing solutions to process and analyze the images. These can include algorithms such as, for example, the Scale Invariant Feature Transform (SIFT), to identify objects, perform mapping, aid in navigation and so on.

Continuing with the current example, when UAV AC1 reaches its terminating docking station (e.g. Dock 2), it lands at the designated landing area of Dock 2. Dock 2, as well as the other docking stations, can be configured with wireless battery charging coils to wirelessly charge AC1 when it lands on the landing pad. Dock 2 can also include wireless communication capabilities to accept the download of the sensor data from AC1 to data storage devices in Dock 2. Accordingly, while docked, AC1 recharges its batteries and transfers sensor data and any other gathered data to Dock 2. The docking stations can include capacity for a single UAV or for multiple UAVs. Accordingly, in some embodiments where multiple UAVs can be accommodated, AC1 can land at Dock 2 before AC2 takes off from Dock 2.

As noted above if the mission requires another leg to be flown (e.g. the leg between Dock 2 and Dock 3) the UAV designated for that leg is initiated and departs the docking station (e.g. Dock 2) to complete its mission as outlined at operations 208 through 214. In one embodiment, the second leg can be flown by AC1 assuming AC1 has sufficient power to complete the second leg or has had sufficient time to recharge at the docking station. In another embodiment, the legs can be flown simultaneously. For example, the second leg can be flown by another UAV such as AC2. In some embodiments, AC2 can fly its leg between Dock 2 and Dock 3 at the same time AC1 is flying its leg between Dock 1 and Dock 2. Likewise other UAVs in the system can fly simultaneous legs as well.

Figure 3:
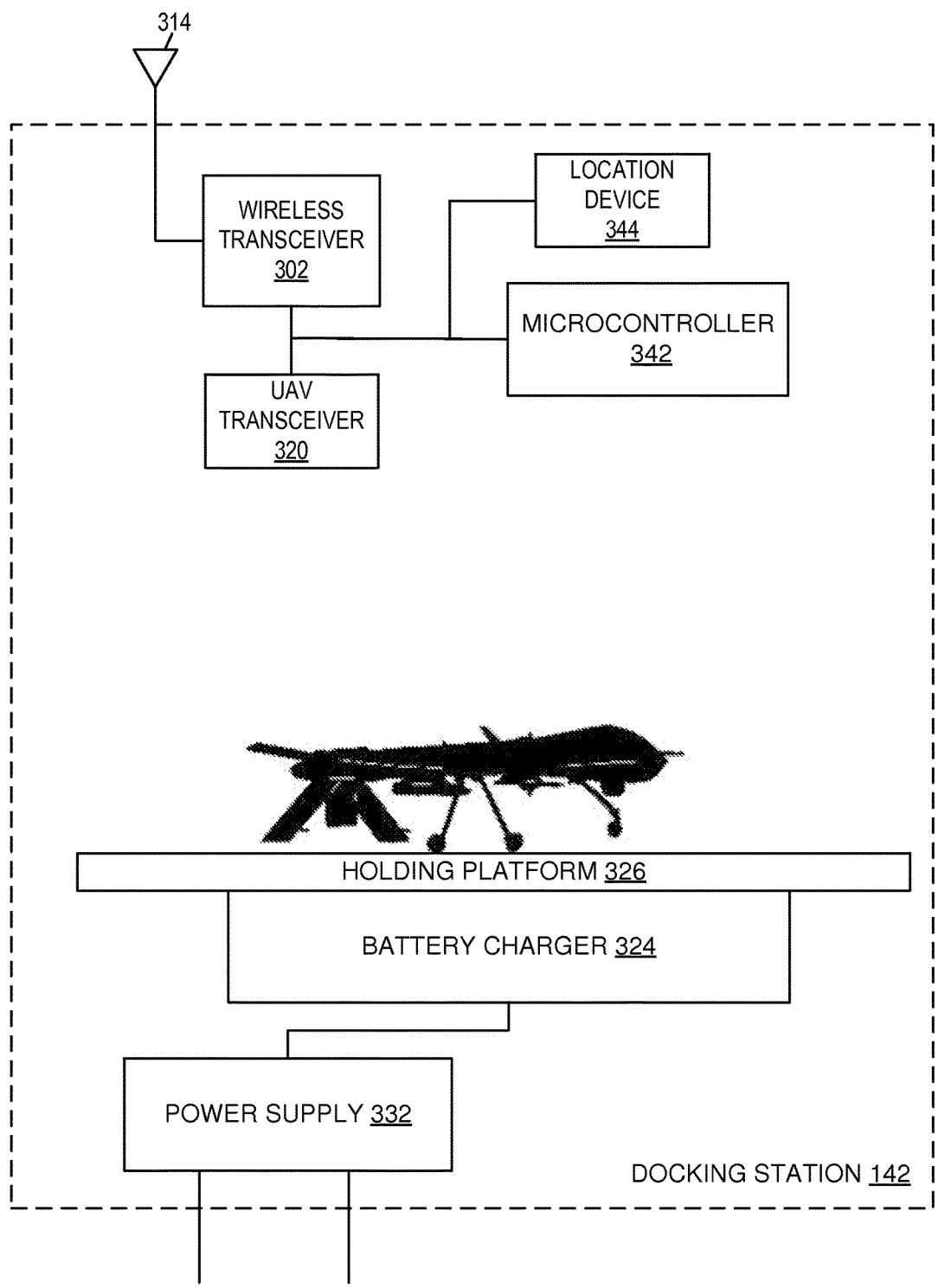
FIG. 3 is a diagram illustrating an example of a docking station in accordance with one embodiment of the technology described herein.

FIG. 3 is a diagram illustrating an example of a docking station 142 in accordance with one embodiment of the technology described herein. Referring now to FIG. 3, this example includes communications capability and battery charging capability, and can also be configured to provide shelter and security for a docked UAV. A holding platform 326 is provided to provide a support platform for the UAV. Holding platform 326 can be appropriately sized for a single UAV or it can be large enough for multiple UAVs. Additionally, in other embodiments, multiple holding platforms can be provided within a single docking station. Accordingly, docking stations 142 can be configured to contain or support multiple UAVs.

An inductive or other wireless battery charger 324 can also be included to charge the batteries of the UAV while it is docked on the holding platform 326. Wireless battery charger 324 can include any of a number of different wireless charging techniques including, for example, inductive chargers using coils to induce current in a corresponding coil in the UAV. As another example, battery charger 324 can include a low-frequency electromagnetic radiation source that transmits its energy to a power-harvesting circuit in the UAV.

Alternatively, wired connections can be made with the UAV by docking the UAV on platform 326 such that electrical contacts on the UAV lineup with and connect to corresponding electrical contacts on platform 326. As a further example, platform 326 can be implemented to include a multitude of conductive surfaces with positive and negative polarities arranged in a determined pattern such that when the UAV is landed on platform 326 corresponding conductors on the docking elements (e.g. feet) of the UAV make the appropriate electrical contact. The determined pattern for these conductive surfaces on the platform can include, for example, a checkerboard pattern. The pattern can be sized and configured such that when one foot of the UAV is on a pattern element of a given polarity, the opposite foot of the UAV will be positioned on a pattern element of the other polarity. Insulative spacing between the pattern elements can be large enough such that a foot of the UAV cannot cause a short between adjacent pattern elements of opposite polarities.

A power supply 332 can be included to provide power to battery charger 324 as well as to the communications equipment (described below). In some embodiments, power supply 332 can be a dedicated power supply for the UAV equipment. In other embodiments, power supply 332 can be an existing power supply used to provide power to other components of the docking station. For example, where the docking station is part of the control box used for signaling controls on a rail line, power supply 332 can be the power supply used to supply power to the signals or other instrumentalities associated with that railroad control box. Power supply 332 can include the appropriate AC to AC, AC to DC, DC to AC, or DC to DC power conversion needed to supply the appropriate power to the various devices.

In the example of FIG. 3, docking station 142 also includes communications equipment, which in this example include a wireless transceiver 302 a UAV transceiver 320 and an antenna 314. UAV transceiver 320 can include a wireless transmitter and receiver to communicate with UAV via a wireless communication link. Any of a number of wireless communication protocols can be used for the communication link between UAV transceiver 320 and the UAV. The MAC and PHY layers of the communication link between UAV transceiver 320 and the UAV can be configured to allow communications dedicated to a particular one of the plurality of UAVs in the docking station 142. This can allow dedicated or specific communication links with individual UAVs. Accordingly, UAV-specific communications can take place. This can allow, for example, mission-specific data to be loaded into a particular UAV. Although not shown, UAV transceiver 320 can also include an antenna to facilitate the wireless communications.

Wireless transceiver 302 is configured to communicate between docking station 142 and external entities such as, for example, a system controller 146 or other servers. For example, wireless transceiver 302 can be implemented using any of a number of wireless communication systems such as, for example, cellular communications. In other embodiments, hardwired communications can be provided to the docking station.

Docking station 142 can also include a microcontroller 342, which can include one or more processors and memory devices to control the operation of docking station 142. This can be a dedicated controller to control the UAV and mission operations, or a shared controller to also control other functions that might be unrelated to the UAV and its missions.

In some embodiments, location assistance devices 344 can also be provided with the docking station to assist the UAV in locating and recognizing the docking station. For example, an IR beacon or a visual pattern generator can be used to provide information that can be recognized by the UAV to allow the UAV to home in on and locate docking station 142. In further embodiments, GPS receivers can be used to allow the UAV to locate its intended docking station 142. In some embodiments, differential GPS can be used to allow one GPS receiver (for example in the base station at a known location) to measure timing errors and provide correction information to the GPS receivers in the UAVs. This can allow timing errors to be eliminated, and can allow more accurate position determination by the UAV.

The docking station can also include an enclosure or other housing to protect the aircraft from the elements or from vandals after landing. Aircraft bay doors can be included in the enclosure to allow the enclosure to be opened for takeoff and landing operations and to be closed at all other times to secure the aircraft inside as well as to secure the other equipment within the enclosure. The enclosure can provide a weatherproof or whether-shielded housing to shield the aircraft and equipment from the environment.

In some embodiments, docking stations 142 can be dedicated stations intended solely to house the one or more UAVs and the associated equipment such as UAV battery chargers and communications equipment. In other embodiments, the docking station can include a housing, enclosure, or other location that provides shared utilization between the UAV and its associated equipment, and equipment or machinery associated with the survey area. For example, enclosures that house switching equipment, signaling equipment and other equipment on a rail line can be modified to accommodate a UAV platform and the associated UAV equipment. As another example, holes, platforms, towers or other structures typically present with the infrastructure element (e.g., power poles, light poles, antenna platforms, and so on) can also be modified or configured to include docking stations 142. Docking stations can also be located in portable facilities such as in a trailer, van or transportable storage pod or they can be constructed as a more permanent structure.

Figure 4:
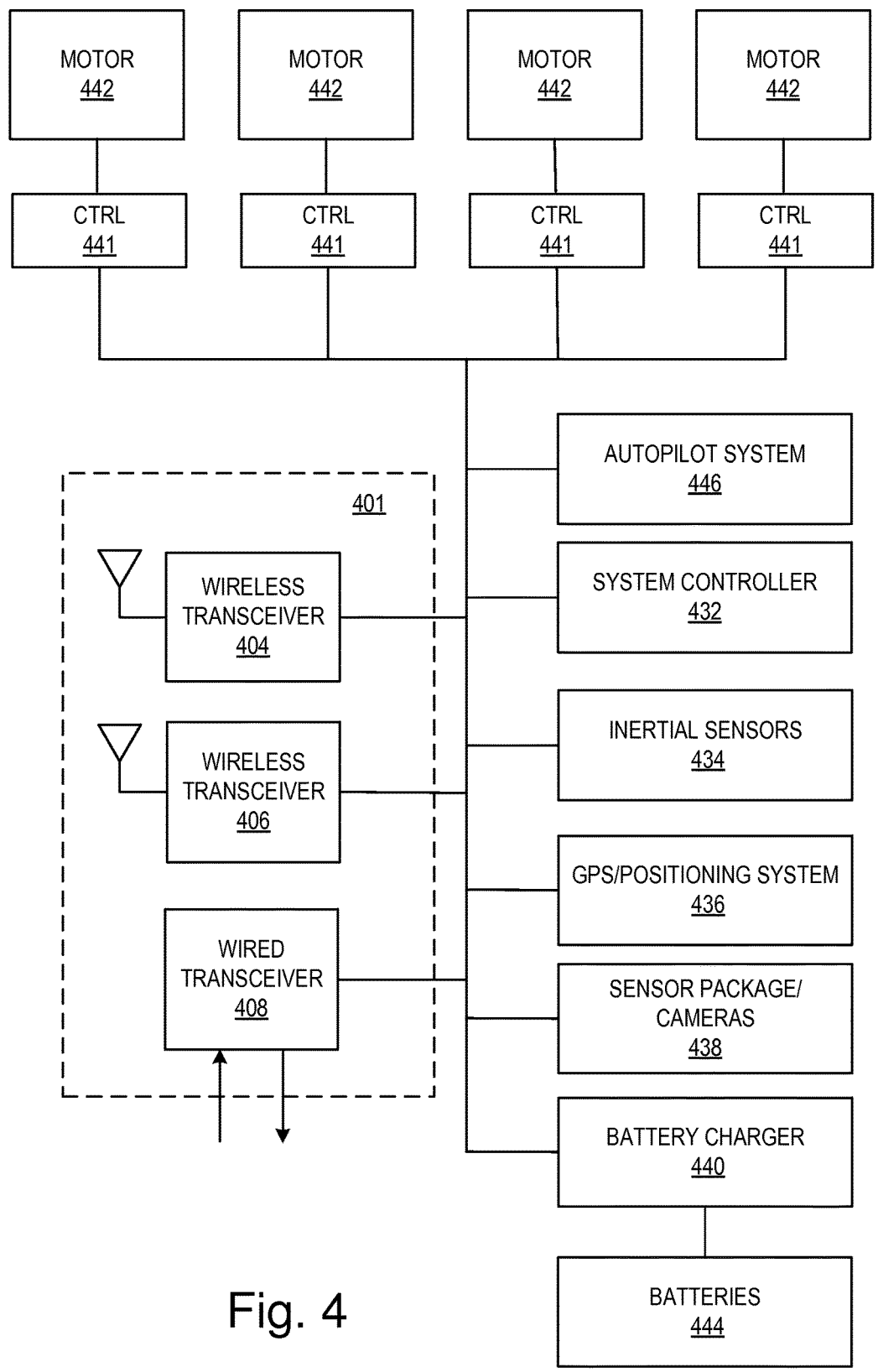
FIG. 4 is a diagram illustrating one example of a UAV configuration in accordance with one embodiment of the systems and methods described herein.

Although the technology disclosed herein can be implemented using any of a number of different UAVs or UAV configurations, one example of a UAV configuration is illustrated at FIG. 4. The example of FIG. 4 is a quad-rotor configuration including four motors 442 to operate for rotors (not illustrated). Speed controllers 441 can also be included to control the speed of rotation of the rotors. Preferably, each motor 442 can be individually controlled by an associated speed controller 441 to allow independent control and operation of the individual rotors of the aircraft. Although a 4-rotor configuration is shown, in other embodiments, other quantities of rotors can be included.

This example UAV also includes a communications interface 401 that can include a wireless transceiver 404 as well as a hardwired transceiver 408. In terms of the example docking station described with reference to FIG. 3, wireless transceiver 404 can be configured to communicate wirelessly with UAV transceiver 320 at docking station 142. This can allow an exchange of mission parameters and mission data between the aircraft in the docking station. Wireless transceiver 406 can also be included to provide longer-range communications, such as communications with the docking station during flight or communications with a central server or controller such as, for example, system controller 146. This longer-range wireless transceiver 406 can be used, for example, to allow remote control of the flight of the UAV as well as to exchange data and other mission information or parameters with the UAV during flight or between missions. Although separate transceivers are illustrated in this example for short range communications with the docking station while docked and longer-range communications beyond the docking station, in other embodiments, the same transceiver can be used for both circumstances. It may be preferable in some embodiments to use separate transceivers because communication protocols and power requirements are generally different for these different communication scenarios. For example, for docked communication with the docking station low-power, short range capabilities can be used such as, for example, through Bluetooth or other close range communication protocols. Whereas for in-flight communication with the docking station or communication with a central server, longer-range communication capabilities such as cellular or satellite communication capabilities can be included.

In addition, a hardwired transceiver 408 can be included to provide a hardwired interface such as, for example, to the plurality of contact surfaces on platform 326. This example UAV is an electric UAV whose rotors are powered by electric motors 442. Accordingly, batteries 444 can be provided to supply the necessary power to motors 442. A battery charger 440 can be included to charge batteries 444 between missions. Solar panels can also be used on surfaces of the UAV to provide power for the battery charger 440. In other embodiments, battery charger 440 can receive power from docking station 142 such as, for example, by the wireless charging techniques described above with reference to FIG. 3. Batteries 444 can be implemented as rechargeable batteries such as, for example, electrochemical cells like nickel metal hydride (NiMH), lithium ion (Li-ion), and lithium ion polymer (Li-ion polymer) cells. Batteries 444 may also comprise other energy storage cells such as, for example, capacitors, supercapacitors and ultracapacitors, and other energy storage devices.

In order to complete its mission, the UAV can further include a sensor package 438. The sensor package can include any of a variety of sensor equipment to allow the UAV to perform its intended survey mission or missions. For example, cameras, IR sensors, ultrasonic sensors, atmospheric or whether sensors, temperature sensors, or other appropriate sensors can be included with the UAV.

A positioning system 436 such as, for example, a GPS or differential GPS positioning system can be used to allow the UAV to determine its location in flight. Other positioning system such as, for example, cellular positioning, a dead reckoning computation system, or other positioning system can be used.

Inertial sensors 434 can be used to aid in flight of the aircraft. Inertial sensors 434 can include inertial measurement sensors systems such as, for example, accelerometers to measure changes in vertical and horizontal velocity of the aircraft, and gyros to measure rotational changes of the aircraft, such as roll pitch and yaw. More particularly, the sensors can include angular and linear accelerometers to measure rotation and acceleration. Accordingly, there can be three angular accelerometers one each for roll, pitch and yaw and three linear accelerometers for movement in three axes (up/down, left/right, forward/reverse).

In combination with the GPS system, the inertial sensors, or inertial measurement unit (IMU) can provide continuous position, heading, velocity and orientation/attitude of the aircraft and can also report on gravitational forces of the aircraft. In some embodiments, the IMU can work in conjunction with the GPS and can be configured to provide position determination when GPS signals are otherwise unavailable such as, for example, inside a tunnel. In some applications, fiber optic and MEMS technology can be used to provide relatively small and lightweight sensors for these applications. A magnetic compass such as a digital magnetic compass can also be included to determine the heading of the aircraft, which can also be determined through the GPS/INS or other position determination system. Inertial sensors can include their own processing system or can share processing capabilities with system controller 432 (described below). The processing system of the inertial sensors can operate to calculate position based on the six degrees of freedom of the aircraft and integrating factors such as acceleration and gravity over time to calculate velocity, velocity to calculate position, and rates to calculate orientation.

An autopilot system 446 can be included to allow the aircraft to fly specified missions with little or no manual intervention. For example, for individual missions parameters such as altitude, flightpath, flight speed, and so on can be programmed in the aircraft can be flown under partial or complete control of autopilot system 446. Autopilot system 446 can be configured to obtain information from inertial sensors 434 and position determination system 436 to control flight of the aircraft. The autopilot system 446 can use its own controller (including one or more processors and associated memory) with associated software to control the aircraft. The controller reads the aircraft's position in the aircraft's attitude from the position determination system 436 and inertial sensors 434 to determine factors such as the position, orientation, heading, velocity, and altitude of the aircraft. This information can be compared with the mission flight plan and autopilot 446 uses this information to guide the aircraft along the specified flightpath into land the aircraft at the designated docking station. Accordingly, autopilot 446 can control motors 442 or throttles of the various engines as well as other components that may be included in the aircraft such as ailerons, flaps, elevators, trim tabs and rudders to control airspeed, altitude, orientation, and direction. For VTOL aircraft, the autopilot can also be configured to control the orientation of the rotors for takeoff, flight, and landing.

A microcontroller or other system controller 432 can be utilized and can include one or more processors and memory devices to control the operation of the aircraft and the various aircraft systems. Although a single block is shown for system controller 432, one or more dedicated controllers (e.g. including one or more processors and associated memory) can be used to control one or more of the individual features or functions of the aircraft. For example, separate controllers can be used to control one or more of the functions such as battery charging, communications, the autopilot system, inertial sensors, the camera and sensor package, the positioning system 436, and so on.

Figure 5:
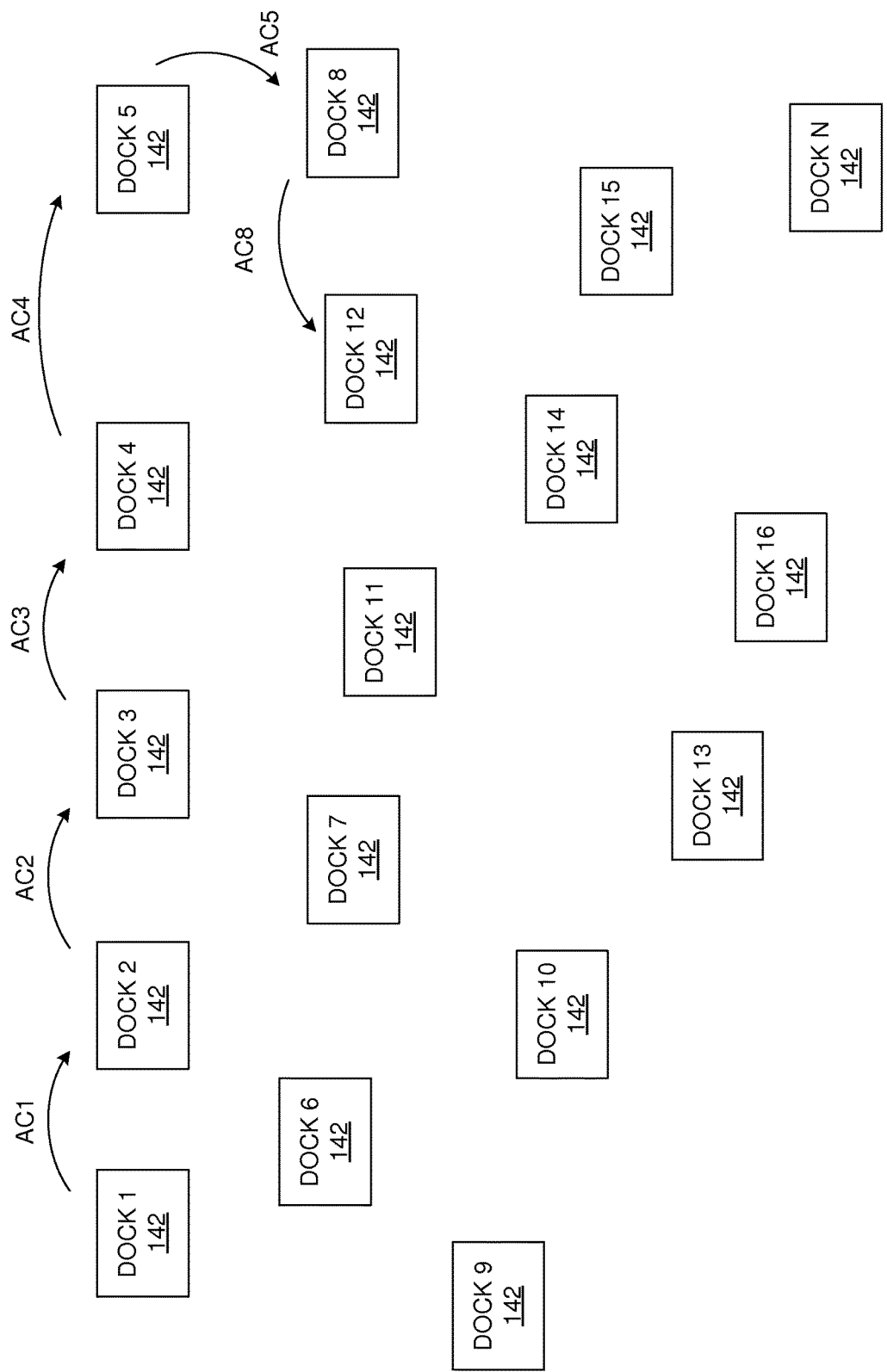
FIG. 5 is a diagram illustrating an example of infrastructure inspection and monitoring for an area infrastructure element, as contrasted with linear infrastructure inspection and monitoring.

Having now described example embodiments of a docking station 142 (FIG. 3) and a UAV aircraft (FIG. 4), as well as an example scenario of a linear survey area of responsibility (FIG. 1) another example survey scenario is now described. FIG. 5 is a diagram illustrating an example of infrastructure inspection and monitoring for an area infrastructure element, as contrasted with linear infrastructure inspection and monitoring. As seen in the example of FIG. 5, a plurality of docking stations are distributed about an example area of responsibility. The example in FIG. 1 shows a linear (although not necessarily a straight line) array of docking stations 142 arranged along a linear infrastructure element such as a rail line, canal or waterway, roadway, or other linear infrastructure element to perform inspection and monitoring. In contrast, the example of FIG. 5 provides area infrastructure inspection and monitoring such that non-linear areas of responsibility on land or sea (including in the air) can be inspected and monitored including, for example, farmlands for crop surveys, facilities for security monitoring, and other areas of interest. As shown in this particular example, there are 17 docking stations 142 distributed across the area of responsibility. In other applications, other numbers of docking stations can be used to provide adequate coverage to the area of responsibility.

The docking stations 142 are distributed across the area of responsibility to form a matrix of docking stations from which UAVs can be deployed to survey the area of interest or subsets thereof. In some embodiments, the matrix can be uniform such that the docking stations form a grid-like pattern, and the grid can have uniform spacing from one docking station to the next. In other embodiments, the matrix can be formed such that the spacing between the docking stations is non-uniform and the docking stations may be positioned as appropriate for sectors within the area of interest or as may be convenient based on existing items of the infrastructure with which the docking stations may be collocated.

With area infrastructures, the operation of the fleet can be similar to that of linear infrastructures in that the individual UAVs in the fleet can be programmed to fly from one docking station to the next docking station sequentially, in a linear fashion through each of the docking stations. For example, in the application illustrated in FIG. 5, UAVs may also fly in a 'linear' flightpath sequentially to each of the docking stations in a defined pattern such as from Dock 1 to Dock 2, to Dock 3, to Dock 4, . . . Dock N (example flight-path arrows shown through Dock 12, but omitted from the remainder of the diagram to avoid unnecessary clutter). However with the example illustrated in FIG. 5 there may be more than one docking station 142 within flight range of any given docking station 142. Thus, for example, an aircraft located at Dock 1 may be dispatched to fly not only to Dock 2, but alternatively to Dock 6 or Dock 9, which are all in range in this example.

Figure 6:
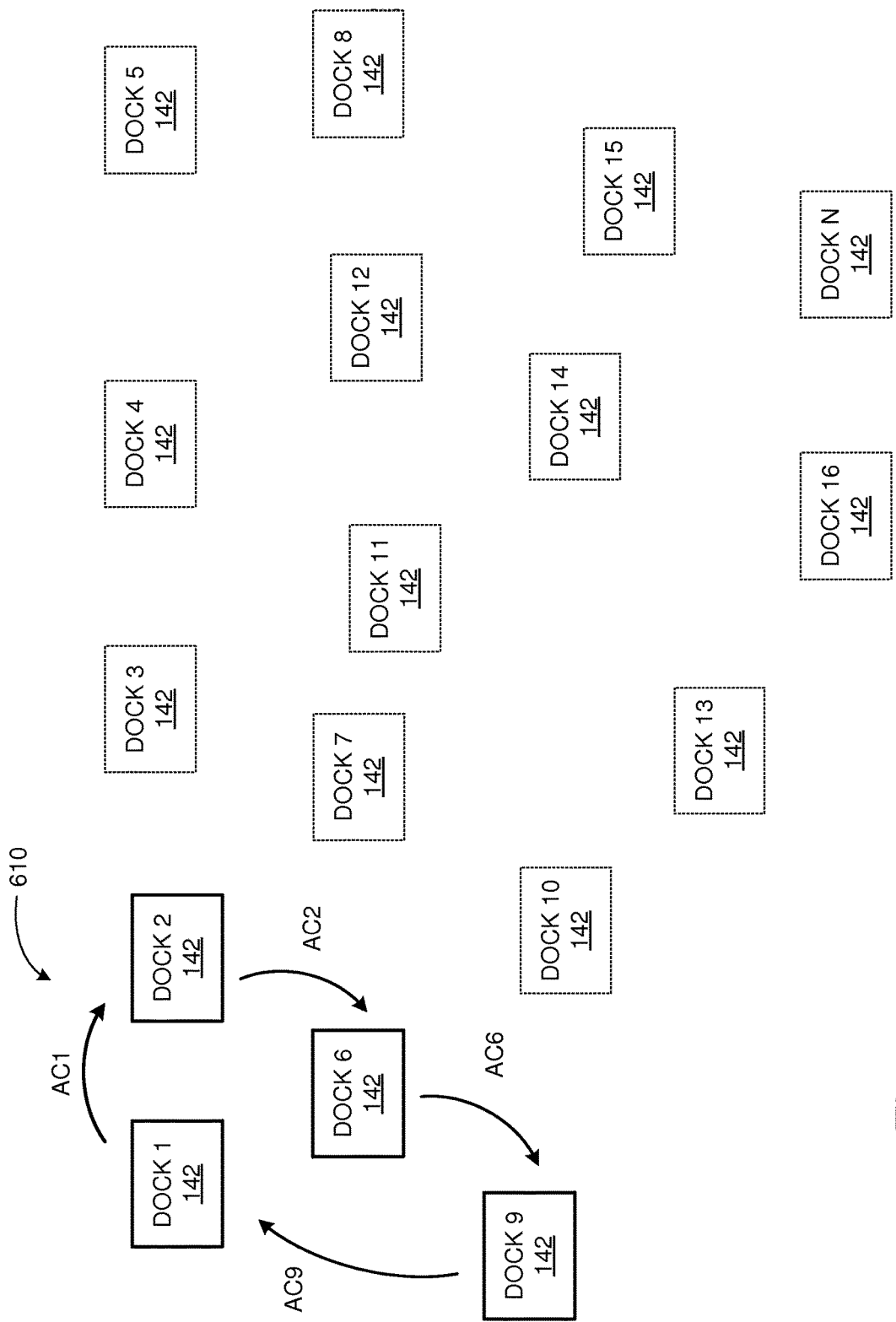
FIG. 6 is a diagram illustrating an example of in which a subset area of responsibility is covered by four a proper subset of stations of the entire set of docking stations in accordance with one embodiment of the systems and methods described herein.

Thus, UAVs can be programmed to have different flight paths depending on a particular mission. For example, as noted above in one embodiment of the example illustrated in FIG. 5, the UAVs can be configured to fly from Dock 1 to Dock 2, Dock 2 Dock 3, Dock 3 to Dock 4, and so on down the line. In an alternative mission configuration such as, for example, where a subset of the entire area of responsibility is defined as an area of interest, alternative flightpaths can be configured to alter the order of docking stations in the flight plans. An example of this is shown in FIG. 6 in which a subset area of responsibility 610 is covered by four docking stations 142, Dock 1, Dock 2, Dock 6 and Dock 9. In this example upon deployment UAV AC1 travels from Dock 1 to Dock 2; UAV AC2 travels from Dock 2 to Dock 6; UAV AC6 travels from Dock 6 to Dock 9; and UAV AC9 travels from Dock 9 to Dock 1. As yet another example, a UAV may be configured to fly out-and-back missions departing its docking station for the mission and returning to the same docking station at the end of its flight. As these examples serve to illustrate, any of a number of subset areas of responsibility and appropriate flightpaths to cover those areas of responsibility can be defined to provide desired coverage for the area infrastructure element.

An example operation of the system is described above with reference to FIG. 2 in terms of the linear infrastructure element. This example operational scenario in FIG. 2 can also be applied to the area infrastructure element. Like the scenario described above, one or more UAV missions can be programmed into the system (operation 202) and the mission programs distributed to the docking stations and UAVs as appropriate. Distribution of the mission programs can be directly to the UAVs and docking stations, to the UAVs via the docking stations, and the distribution can be carried out by system controller 146.

The UAVs are deployed to their assigned docking stations 142 (operation 204) and at the appropriate time, a survey mission such as an investigation or monitoring mission is initiated (operation 206). Upon initiation of the mission, each UAV in the mission departs its docking station at its designated time, follows its designated programmed flight path and collects the appropriate sensor data as defined by the mission parameters (Operations 208 and 210). At the end of its flightpath the UAVs dock at their respective arrival docking stations where they can be recharged or refueled and data transferred to the docking station and ultimately to the system controller 146 (operations 212 and 214). The mission may include multiple legs in which case the UAVs depart on the next leg of the mission (operation 216). Once the mission is concluded, the UAVs remain at the docking stations and await the start of a new mission (operation 218).

As these examples serve to illustrate, because the areas of responsibility are divided into smaller zones or sectors, the entire infrastructure element can be covered by a plurality of UAVs, and a given UAV assigned to inspect or monitor a given zone. Accordingly, the individual UAVs do not need to have the range, velocity or data storage capabilities to cover the entire infrastructure element in a single flight. This can allow the infrastructure element to be covered with a plurality of smaller, lower cost, lighter weight aircraft than would typically be required if a single aircraft were to cover the entire infrastructure element.

The examples illustrated above refer to various mission parameters that can be defined for a given mission or other inspection and monitoring activity or other requested activity. In addition to those described above, mission parameters can further include parameters such as, for example: a desired location and orientation of the aircraft so as to, for example, point a camera or other sensor at a specific point on the earth or infrastructure element from a particular vantage point; a path to be followed by the UAV to allow it to gather sensor data along the desired path on the ground; an area that must be surveyed by the UAV's sensor package; speed, altitude, aircraft orientation and other flight parameters (including in some embodiments, for example, hovering over a given location to monitor activities at that location) to allow the appropriate sensor data to be gathered for the given mission requirements; and other like instructions or parameters to control the UAVs so that they perform the tasks required or gather the appropriate data to complete the mission requirements.

Upon initiating a mission, selected aircraft may be dispatched based on a number of mission parameters and aircraft parameters. For example, the system controller can be configured to dispatch a particular aircraft to respond to the requested activity based on parameters such as current charge state of the aircraft, total time in service of the aircraft, installed payload (e.g. sensor packages) of the aircraft, mission duration, and mission data gathering requirements. These considerations may be less important in the case of a linear infrastructure element where the aircraft are intended to travel sequentially from one docking station to the next to perform their inspections and might thus be specified to meet the requirements of the entire line. However, in the case of an area infrastructure element, depending on the particular area to be surveyed within the area infrastructure element, and depending on the type of survey required, different aircraft may be more suitable for the requested activity and the system controller can use the above parameters to determine which aircraft to dispatch to meet the mission requirements.

As noted above, in some applications UAVs can be manually delivered to their respective initial docking stations by human delivery. In other embodiments, UAVs can be delivered to their respective designated docking stations by first delivering them to a system-entry-point docking station and flying the UAVs to their respective designated or initial docking stations from the entry point, which may include one or more hops. Each of these scenarios allows the docking stations to be fully populated prior to a mission. However, in other embodiments missions can be accomplished while flying aircraft to the respective designated docking stations. That is sensor information can be gathered during this phase of populating UAVs to the network.

In some embodiments, the UAVs can be designed such that they can cover the entire length of the linear infrastructure element before needing to be replaced or refurbished. In such embodiments, the UAVs can be entered into the system at a docking station at one and of the infrastructure element (e.g. Dock 1 in the example of FIG. 1); traverse the infrastructure element (e.g., one docking station at a time), stopping to recharge and perform any pre- or post-flight tasks (e.g., data transfer) at each sequential docking station until it reaching the last docking station, and then be removed from the system for refurbishment or replacement at the other end of the infrastructure element (e.g. Dock N in the example of FIG. 1). Accordingly, a rotation of the fleet can be accomplished in this manner. Likewise, UAVs may shuttle between docking stations in various patterns that optimize their lifespan, perform some amount of age leveling, or accomplish other network management goals. Similar configurations can be implemented for area infrastructure elements as well, where UAVs are specified such that they can cover their respective entire planned flight plan from an entry point to an exit point before needing to be replaced.

Spacing of docking stations 142 in the linear and non-linear arrangements can be selected and implemented based on the range of the UAVs selected for operation in the network. For example, the distance between any two immediately adjacent docking stations is ideally less than the range capability of the UAV or UAVs intended to fly between those docking stations such that a comfortable margin of safety is provided to ensure that the UAV reaches its intended destination before running out of fuel or battery power, or sensor data storage capacity. Factors that affect range can also be taken into account and can include wind, temperature atmospheric density and other weather or environmental conditions; battery age; aircraft age and condition; and so on.

Figure 7:
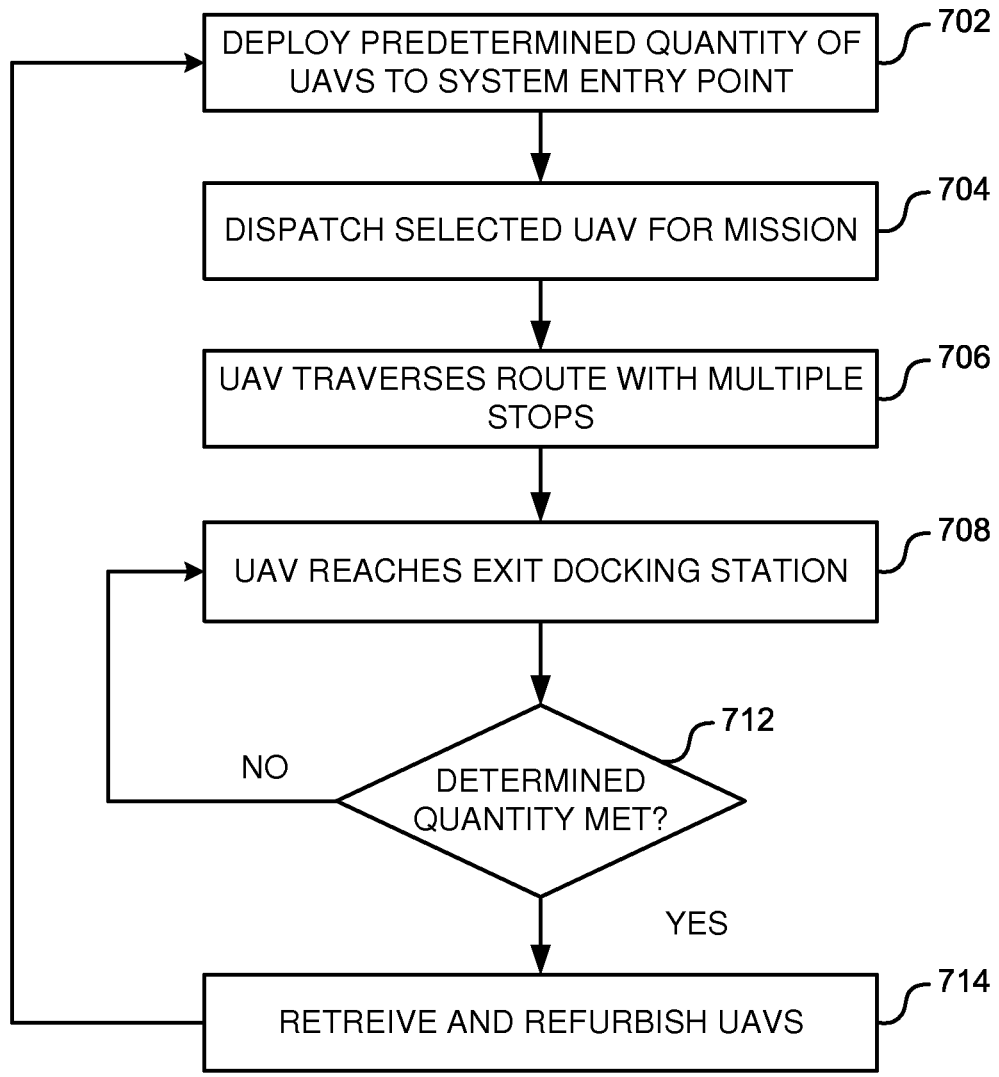
FIG. 7 is an operational flow diagram illustrating an example scenario for the autonomous UAV fleet rotation in a linear arrangement in accordance with one embodiment of the systems and methods described herein.

FIG. 7 is an operational flow diagram illustrating an example scenario for the autonomous UAV fleet rotation in a linear arrangement in accordance with one embodiment of the systems and methods described herein. With reference now to FIG. 7, at operation 702 a predetermined quantity of UAVs is deployed to a system entry point. For example, a given docking station 142 within the network can be designated as the system entry point for UAVs. It is the system entry point from which multiple UAVs can be dispatched to their respective initial docking stations. In the example of FIG. 1, the entry point can be designated as, for example, Dock 1. Depending on the size of the entry- and exit-point docking stations and their ability to accommodate multiple UAVs, different quantities of UAVs can be deployed at the system entry point.

In further embodiments, the system entry point, and indeed the exit point, can be defined as location external to the docking stations. For example, in some embodiments, the aircraft can be released from an external point that is within range of one or more docking stations, and the aircraft can be programmed to fly to these docking stations as their entry into the system. For example, the aircraft can be released from a truck that is driven to a location within range of one or more docking stations. This can allow, for example, more remote placement of the docking stations and can relax a requirement that at least one of the docking stations be accessible to serve as an entry point or an exit point itself.

At operation 704, a $1^{st}$ of the quantity of UAVs at the system entry point (e.g. at Dock 1) is dispatched for a mission. At operation 706, this UAV traverses the inspection path defined for the mission. In the case of the linear infrastructure element (e.g., rail line 144) this UAV traverses the docking stations 142 sequentially along that infrastructure element. In some embodiments, when the $1^{st}$ UAV reaches the $2^{nd}$ docking station 142 (e.g., Dock 2 in the example of FIG. 1) or departs the $2^{nd}$ docking station on the next leg of its mission, the $2^{nd}$ UAV is dispatched from Dock 1 to traverse the route. This staged dispatch of UAVs from the system entry point along the route continues until there are no more UAVs to be dispatched from the system entry point.

As each UAV reaches the exit docking station (e.g. dock N in the example of FIG. 1) the system determines whether a determined quantity of aircraft are at the exit docking station. When this predetermined quantity is met, the UAVs can be retrieved from the exit docking station in return for refurbishing. At this time, a new quantity of UAVs can be distributed to the system entry point. Alternatively, rather than waiting for UAVs to be retrieved, new UAVs or other refurbished UAVs can be delivered to the system entry point to allow a continuous operational rotation as described.

This rotational operation is well-suited to a linear infrastructure element where UAVs traverse from one end of the element to the other, providing a logical entry and exit point for the UAVs. However, this rotational operation can also be utilized for area inspection elements in a number of operational configurations. For example, linear or sequential flightpaths from one docking station to the next can also be configured with area inspection elements, and entry and exit points designated along the way. As another example, the sequential flightpaths can be defined within an area infrastructure element to begin and end at the same docking station. Accordingly, new or refurbished UAVs can be delivered to this docking station and the used UAVs can be retrieved from the same docking station. As yet another alternative, various system entry and system exit points can be identified within the area infrastructure to allow a similar operation.

Because the docking stations that are designated as system entry points and system exit points may hold a larger quantity of UAVs in this scenario, these docking stations can be larger than the interim docking stations along the infrastructure element path.

In the event an UAV is lost or damaged, various operational scenarios can be implemented to accommodate this loss. For example, in the event of a linear inspection configuration, if a UAV at a given docking station along the path is lost, that UAV can be effectively replaced by shifting UAV units from the docking stations closer to the system entry point to their next sequential docking station and adding one additional UAV to the system entry point (or alternatively commissioning into service a spare UAV already located at the system entry point). Accordingly, even if the UAV that is lost is far down the line in a remote area that would be difficult to reach to manually deliver a replacement, the shifting mechanism can allow its replacement to be deployed without requiring special delivery. This can be beneficial, for example, where a UAV is lost at a remote station hundreds of miles away from the nearest warehouse or other service facility.

Figure 8:
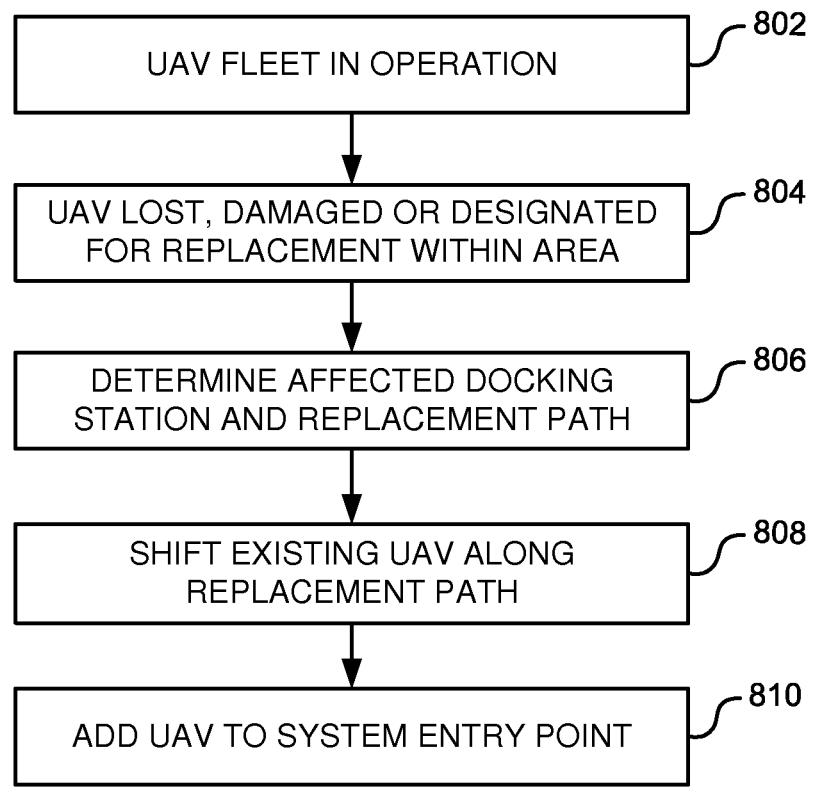
FIG. 8 is an operational flow diagram illustrating a process for replacing a lost or damaged UAV within an area infrastructure implementation in accordance with one embodiment of the systems and methods described herein.
Figure 9:
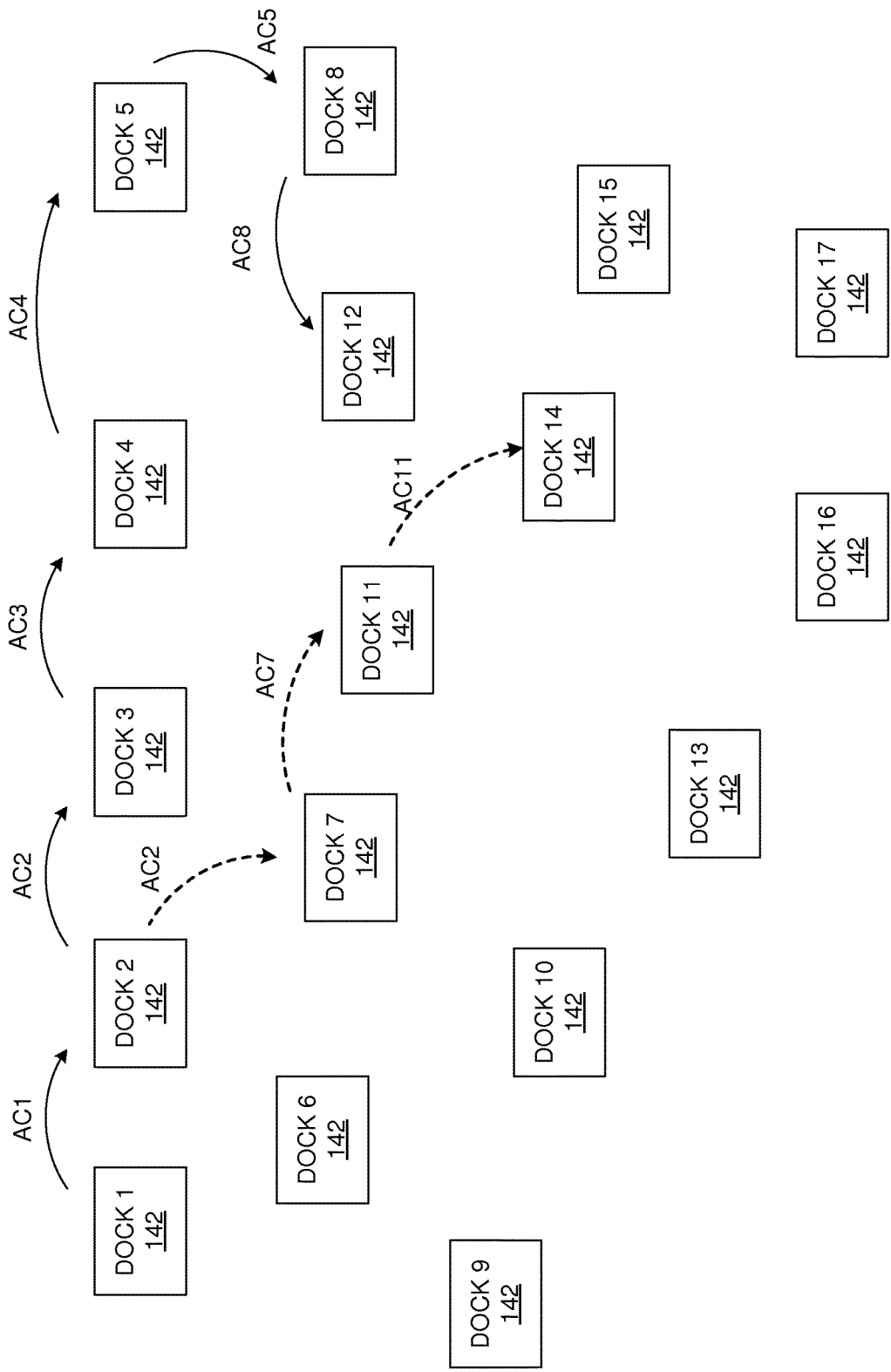
FIG. 9 is a diagram illustrating an example of replacement in terms of the example environment illustrated at FIG. 5 in accordance with one embodiment of the systems and methods described herein.

In an area infrastructure configuration, lost or damaged aircraft can be replaced without necessarily having to shift aircraft along an entire sequential path. This can be accomplished depending on the location of the loss, because with area infrastructures there may be a shorter path to replace the lost UAV instead of following the normal sequential path through the docking stations. FIG. 8 is an operational flow diagram illustrating a process for replacing a lost or damaged UAV within an area infrastructure implementation. FIG. 9 is a diagram illustrating an example of such replacement in terms of the example environment illustrated at FIG. 5. At operation 802, a UAV fleet is in operation in the area infrastructure shown in FIG. 9. At operation 804 assume a UAV is lost or damaged within the area. For purposes of illustration assume that the UAV affected leaves a UAV vacancy at Dock 14. At operation 806 the system controller 146 or other element in the system identifies the loss, determines the affected docking station, and computes an efficient path from a system entry point to the affected docking station. For example, the docking stations can be configured to trigger an alarm or otherwise message the system controller if an aircraft is not arrived by a predetermined time. Thus, in this example affected docking station (Dock 14) can send a message to the system controller indicating that it's anticipated UAV has not arrived. At this time, the system controller can compute a replacement path (or replacement paths can be precomputed or manually determined and entered into the system in advance or in real time). In this example Dock 1 is the system entry point and the replacement path is from Dock 1 along the path: Dock 2, Dock 7, Dock 11, Dock 14. This path is illustrated by dashed arrows in FIG. 9. Accordingly, at operation 808 existing UAVs at the docking stations in the path can be shifted along this replacement path from Dock 11 to Dock 14; from Dock 7 to Dock 11; from Dock 2 to Dock 7; and from Dock 1 to Dock 2. This shift can be performed by serially or simultaneously shifting the affected UAVs along this replacement path. And at operation 810, a replacement UAV, whether new or refurbished is commissioned into the fleet. This can be a UAV delivered to the system entry point (e.g., Dock 1) for purposes of this particular replacement, or a spare UAV already located at the system entry point. The system can be configured to contain enough spare aircraft to handle the loss of more than one aircraft without requiring new aircraft to be commissioned into the fleet. These additional aircraft can be stored at the system entry point, or they can be stored at other docking stations throughout the network of docking stations. For example, in some embodiments, docking stations located at regular intervals along a linear infrastructure element, or it regularly spaced locations (e.g. on a grid) within an area infrastructure element can allow replacement of lost aircraft with fewer hops required.

Various examples described above refer to system entry and exit points whether in a linear or area infrastructure environment. The system entry point can typically be identified as a location in the infrastructure that is convenient to access by maintenance or other personnel or that may be near a warehouse or maintenance facility. Although the entry and exit points are shown in the example of FIG. 1 at each end of the linear infrastructure element (which may represent the entire element or which may be a segment of a longer linear infrastructure element), system entry or exit points may be otherwise located. Likewise for an area infrastructure the system entry and exit points may be on the edge of the area or internal to it. Furthermore, a single docking station can in some embodiments serve as both the system entry point and system exit point.

In addition to monitoring the linear or area inspection elements, configurations can be implemented to monitor an event such as something occurring at a discrete location or such as a particular item of interest. For example, there may be the location of interest that can be monitored by an aircraft hovering over that location such as, for example, crime-scene monitoring, security monitoring of a given location, accident-scene monitoring, or other monitoring of a discrete, fixed location. As another example, there may be an item or situation of interest that is a moving target such as, for example, a moving herd of cattle, a barge or other traffic moving along a canal, equipment moving along a roadway, security threats moving about an open area, or other like moving targets. Because the requested activity may be indefinite in time, or may have a required duration that is greater than the UAV's individual flight time, a single UAV may not be capable of covering the requested activity, whether stationary or moving. Accordingly, in some embodiments the system can be configured to dispatch replacement aircraft to arrive at the location to take over the monitoring duties specified by the requested activity. For example, a first UAV can be dispatched to cover the requested activity at the designated scene. Because the system controller can determine that first UAV's capabilities for flight time, data storage, and other mission-important system limits, the system controller dispatches a second UAV to the location to take over for the first UAV before the system limits are reached for the first UAV. This can be repeated for additional UAVs to provide overlapping coverage such that the end-user experience has little no interruption in service. By using a 'tag-team' approach to provide overlapping coverage of an area, this process can provide effectively continuous coverage of the event. That is, the process can provide coverage that does not suffer from a break in coverage due to the absence of a monitoring aircraft.

Because different aircraft are used to collect and communicate data in this tag-team approach, the system controller can further be configured to route the control and payload telemetry such that the change in UAVs appear seamless to the end-user. In embodiments where the mission program is running on the UAV's processor, this mission program (for example, a virtual machine instance) may be moved from the initial UAV to the replacement UAV such that the mission can continue. In some embodiments, this can be accomplished via live migration as used in other instances of hardware virtualization. As such, embodiments can be configured such that multiple UAVs with short flight times or low data storage capabilities can be utilized in a tag-team fashion to provide effectively continuous on-station monitoring, long-distance coverage, or large-area coverage as may be performed by a single larger UAV or manned aircraft.

Utilizing UAVs to cover multiple zones and utilizing automated flight control allows the traditional link of one pilot to one aircraft to be broken. This can allow the operational cost of the unmanned aircraft system to be lower than the operational cost of the traditional manned aircraft operations. Automation of launch, flight, recovery, and recharging functions allows more than one aircraft to be operated autonomously with limited human operator intervention or control. A single human operator can be provided to monitor the operation of a plurality of simultaneous UAV flights along the linear or grid layout of the flightpaths between the docking stations. Because the range requirements of the aircraft are limited, as discussed above smaller and lighter weight aircraft can be used. The systems implemented with these aircraft can enhance the safety of the system, including the safety of other users, the airspace, and people and property on the ground.

Likewise, embodiments can be implemented to provide a higher refresh rate and more timely response to real-time requests for inspection and monitoring. Additionally, anomalies or other situations requiring inspection of a particular area can achieve a directed focus without having to dispatch an aircraft from far away. If an anomaly or other situation occurs or is suspected at point between two docking stations, and aircraft one of those two docking stations can be dispatched for a short-duration flight to make the appropriate inspection. Systems can be implemented in various configurations to provide greater resolution, lower cost and less risk as compared to conventional methods of inspecting and monitoring.

Figure 10:
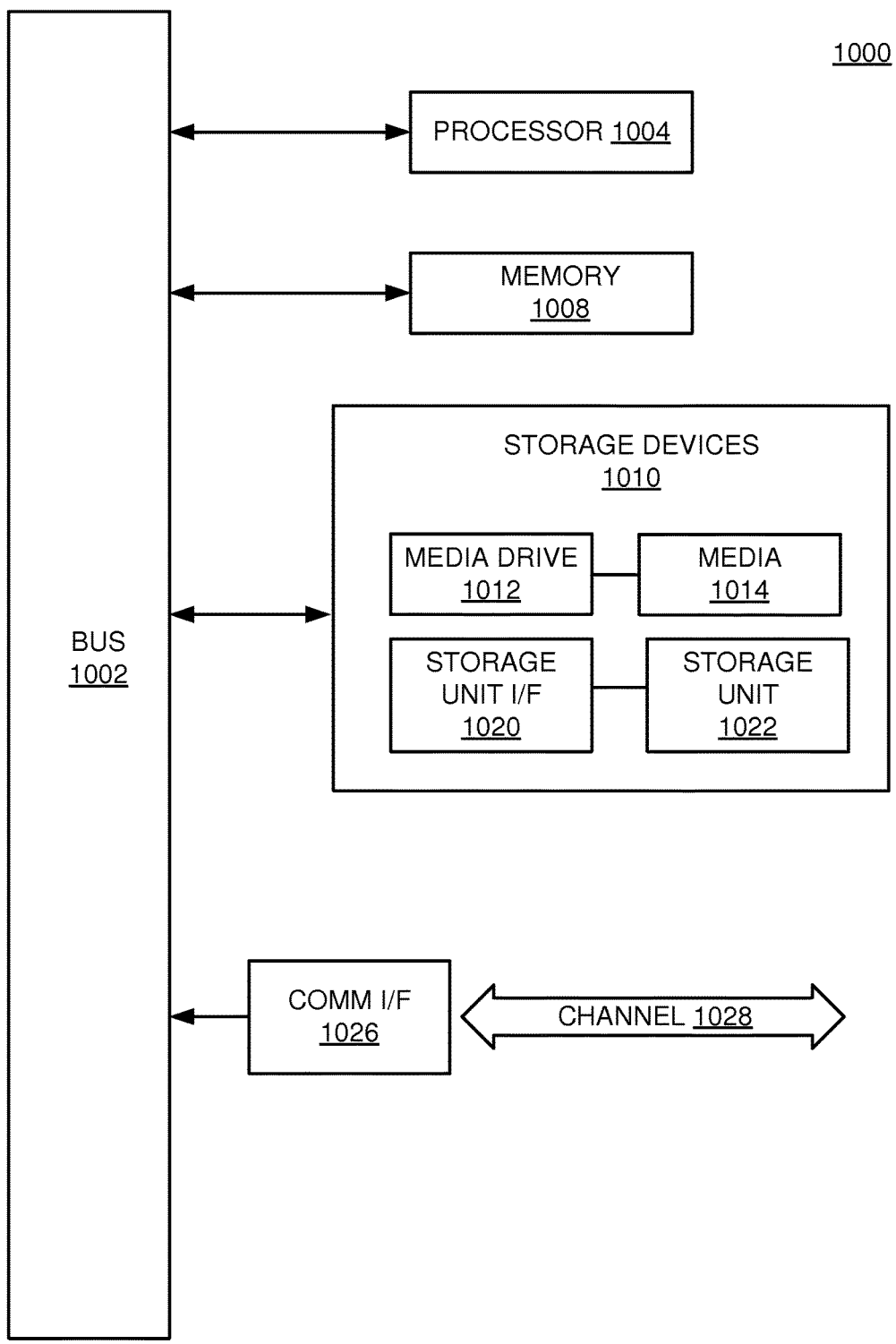
FIG. 10 illustrates an example computing module that may be used in implementing various features of embodiments of the disclosed technology.

Various controllers are described above to control the operation of the elements of the systems and methods described herein. These controllers are described at times as including one or more processors in one or more memory elements. Controllers need not be limited to processors executing software and indeed can be implemented using one or more processors, controllers, ASICs, PLAs, PALs, CPLDs, FPGAs, logical components, software routines or other mechanisms. In implementation, the various controllers or processors described herein might be implemented as discrete elements for dedicated functions, or the functions described can be shared in part or in total among one or more processing elements. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate controllers, one of ordinary skill in the art will understand that these features and functionality can be shared among one or more common software and hardware elements, and such description shall not require or imply that separate hardware or software components are used to implement such features or functionality.

Where controllers are implemented in whole or in part using processors executing software, in one embodiment, these elements can be implemented as a processor capable of carrying out the functionality described with respect thereto. One such example processing unit is shown in FIG. 10. Various embodiments are described in terms of this example processing unit 1000. After reading this description, it will become apparent to a person skilled in the relevant art how to implement the technology using other processing configurations or architectures.

Referring now to FIG. 10, computing processor module 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of surveying an area of interest with a fleet of UAVs deployed to a plurality of docking stations positioned at predetermined locations within the area of interest, the method comprising:
   programming each of the plurality of UAVs with a survey mission comprising survey mission parameters and a flight path, wherein the area of interest is divided into a plurality of sectors that are smaller than the area of interest, and the programming comprises programming each UAV of the plurality of UAVs to follow a flight path to survey a first sector of the area of interest that is different from the sectors surveyed by the other UAVs of the plurality of UAVs;
   each of the plurality of UAVs performing its programmed survey mission for its respective first sector, the programmed survey mission for each UAV comprising:
      the UAV departing from a first docking station;
      the UAV following its programmed flight path along its first sector of the area of interest;
      the UAV using sensors to gather sensor data along the UAV's programmed flight path;
      the UAV landing at a terminating docking station, wherein the terminating docking station is not the first docking station; and
      the UAV transferring sensor data gathered during the mission;
   wherein, as a result of the plurality of UAVs each surveying a different sector of the area of interest, the area of interest is surveyed by the combined operations of the plurality of UAVs;
   wherein, in deploying the UAVs to the plurality of docking stations and prior to performing the programmed survey mission of the first sector, the plurality of UAVs are delivered to a docking station configured as a system entry point that is capable of holding the plurality of UAVs, and the plurality of UAVs are distributed to their respective first docking stations by flying each of the plurality of UAVs from the system entry point to its respective first docking station.

2. The method of claim 1, further comprising each of the plurality of UAVs performing a subsequent survey mission in which each UAV of the plurality of UAVs surveys a second sector of the area of interest that is different from the sectors surveyed by the other UAVs of the plurality of UAVs in the subsequent survey mission, the subsequent survey mission for each UAV comprising:
   the UAV departing from the docking station at which its prior survey mission terminated;
   the UAV following a second programmed flight path along its second sector of the area of interest;
   the UAV using sensors to gather sensor data along the UAV's second programmed flight path;
   the UAV landing at a second terminating docking station; and
   the UAV transferring sensor data gathered during the mission.

3. The method of claim 1, wherein the area of interest comprises a linear infrastructure element and the docking stations are deployed along the linear infrastructure element in a sequential arrangement and the terminating docking station for each of the plurality of UAVs is the next docking station in that sequential arrangement relative to the docking station from which that UAV was deployed.

4. The method of claim 1, wherein the area of interest comprises an area infrastructure element and the docking stations are deployed in a matrix within the area of interest.

5. The method of claim 4, wherein the mission parameters identify a proper subset of docking stations within the plurality of docking stations.

6. The method of claim 1, wherein the UAV transferring sensor data comprises the UAV relaying sensor data via the docking station to a fleet controller while the UAV is docked at the docking station.

7. The method of claim 1, wherein the UAV transferring sensor data comprises the UAV transmitting sensor data to a fleet controller while the UAV is conducting the survey mission.

8. The method of claim 1, wherein the mission parameters for an identified survey mission comprise locations of the docking stations in a survey area, identification of a subset of docking stations included in a mission, flight paths between identified docking station pairs, flight altitude or speed along the flight paths, sensor utilization along the flight path, camera angles, mission start times or intervals, or data collection or communication requirements.

9. The method of claim 1, further comprising the terminating docking station recharging an energy storage cell of the UAV while the UAV is docked at the docking station.

10. The method of claim 1, further comprising a UAV of the plurality of UAVs performing subsequent survey missions such that the UAV traverses the area of interest from one docking station to a next docking station for each subsequent mission until the UAV reaches a system exit point.

11. The method of claim 1, further comprising defining an area of responsibility as a subset of the area of interest and wherein the mission parameters specify the docking stations within that area of responsibility and the programming comprises programming a UAV at each of the specified docking stations to follow a flight path to survey a first sector of the area of responsibility that is different from the sectors surveyed by the other UAVs at each of the specified docking stations.

12. The method of claim 1, wherein a single human operator is used to pilot the plurality of UAVs simultaneously for the survey mission.

13. The method of claim 1, further comprising a process for replacing a UAV of the fleet, the process comprising:
a system controller identifying a UAV of the fleet of UAVs that is lost, damaged or otherwise required to be replaced;
the system controller determining a current docking station for the identified UAV of the fleet; and
the system controller initiating one or more flights of operational UAVs in the fleet to shift existing operational UAVs along a replacement path to provide an operational UAV at the determined docking station.

14. The method of claim 13, further comprising the system controller determining the replacement path, wherein the replacement path comprises a series of docking stations between a system entry point and the determined docking station.

15. The method of claim 13, wherein a docking station at the beginning of the replacement path houses a plurality of UAVs and shifting existing operational UAVs along a replacement path comprises shifting one of the plurality of UAVs at the docking station at the beginning of the replacement path to a next docking station in the replacement path such that there is a remaining operational UAV at the docking station at the beginning of the replacement path.

16. The method of claim 13, further comprising the system controller determining the replacement path, wherein the replacement path is a path determined within a matrix of docking stations and its determination is based on an initial docking station having a source of operational UAVs and a minimum path length between that initial docking station and the determined docking station.

17. A method of surveying an area of interest with a fleet of UAVs, the method comprising:
deploying a plurality of UAVs to a plurality of docking stations positioned at predetermined locations within the area of interest;
programming each of the plurality of UAVs with a survey mission, the survey mission including mission parameters;
each UAV of the plurality of UAVs departing a respective first docking station at which it is deployed, following a flight path defined by the mission parameters, gathering sensor data along the flight path and landing at a respective terminating docking station, wherein the terminating docking station of each UAV is not the first docking station of the respective UAV;
and
the UAV transferring sensor data gathered during the mission;
wherein deploying the plurality of UAVs to the plurality of docking stations comprises, prior to performing the survey mission in an area of interest, delivering the plurality of UAVs to a docking station configured as a system entry point that is capable of holding the plurality of UAVs, and distributing the plurality of UAVs to their respective first docking stations by flying each of the plurality of UAVs from the system entry point to its respective first docking station.

18. A method of surveying an area of interest with a fleet of UAVs deployed to a plurality of docking stations positioned at predetermined locations within the area of interest, the method comprising:
programming each of the plurality of UAVs with a survey mission comprising survey mission parameters and a flight path, wherein the area of interest is divided into a plurality of sectors that are smaller than the area of interest, and the programming comprises programming each UAV of the plurality of UAVs to follow a flight path to survey a first sector of the area of interest that is different from the sectors surveyed by the other UAVs of the plurality of UAVs;
each of the plurality of UAVs performing its programmed survey mission for its respective first sector, the programmed survey mission for each UAV comprising:
the UAV departing from a first docking station;
the UAV following its programmed flight path along its first sector of the area of interest;
the UAV using sensors to gather sensor data along the UAV's programmed flight path;
the UAV landing at a terminating docking station; and
the UAV transferring sensor data gathered during the mission;
wherein, as a result of the plurality of UAVs each surveying a different sector of the area of interest, the area of interest is surveyed by the combined operations of the plurality of UAVs;
wherein the method further comprises a process for replacing a UAV of the fleet, the process for replacing a UAV of the fleet comprising:
a system controller identifying a UAV of the fleet of UAVs that is lost, damaged or otherwise required to be replaced;
the system controller determining a current docking station for the identified UAV of the fleet;
the system controller determining a replacement path, wherein the replacement path comprises a series of docking stations between a system entry point and the determined docking station; and
the system controller initiating one or more flights of operational UAVs in the fleet to shift existing operational UAVs along the replacement path to provide an operational UAV at the determined docking station.

19. The method of claim 18, further comprising a UAV of the plurality of UAVs performing subsequent survey missions such that the UAV traverses the area of interest from one docking station to a next docking station for each subsequent mission until the UAV reaches a system exit point.

20. A method of surveying an area of interest with a fleet of UAVs deployed to a plurality of docking stations positioned at predetermined locations within the area of interest, the method comprising:
programming each of the plurality of UAVs with a survey mission comprising survey mission parameters and a flight path, wherein the area of interest is divided into a plurality of sectors that are smaller than the area of interest, and the programming comprises programming each UAV of the plurality of UAVs to follow a flight path to survey a first sector of the area of interest that is different from the sectors surveyed by the other UAVs of the plurality of UAVs;
each of the plurality of UAVs performing its programmed survey mission for its respective first sector, the programmed survey mission for each UAV comprising:
the UAV departing from a first docking station;
the UAV following its programmed flight path along its first sector of the area of interest;
the UAV using sensors to gather sensor data along the UAV's programmed flight path;
the UAV landing at a terminating docking station; and
the UAV transferring sensor data gathered during the mission;
wherein, as a result of the plurality of UAVs each surveying a different sector of the area of interest, the area of interest is surveyed by the combined operations of the plurality of UAVs;
wherein the method further comprises a process for replacing a UAV of the fleet, the process for replacing a UAV of the fleet comprising:
a system controller identifying a UAV of the fleet of UAVs that is lost, damaged or otherwise required to be replaced;
the system controller determining a current docking station for the identified UAV of the fleet; and
the system controller initiating one or more flights of operational UAVs in the fleet to shift existing operational UAVs along a replacement path to provide an operational UAV at the determined docking station;
wherein a docking station at the beginning of the replacement path houses a plurality of UAVs and shifting existing operational UAVs along the replacement path comprises shifting one of the plurality of UAVs at the docking station at the beginning of the replacement path to a next docking station in the replacement path such that there is a remaining operational UAV at the docking station at the beginning of the replacement path.

21. The method of claim 20, further comprising a UAV of the plurality of UAVs performing subsequent survey missions such that the UAV traverses the area of interest from one docking station to a next docking station for each subsequent mission until the UAV reaches a system exit point.

22. A method of surveying an area of interest with a fleet of UAVs deployed to a plurality of docking stations positioned at predetermined locations within the area of interest, the method comprising:
programming each of the plurality of UAVs with a survey mission comprising survey mission parameters and a flight path, wherein the area of interest is divided into a plurality of sectors that are smaller than the area of interest, and the programming comprises programming each UAV of the plurality of UAVs to follow a flight path to survey a first sector of the area of interest that is different from the sectors surveyed by the other UAVs of the plurality of UAVs;
each of the plurality of UAVs performing its programmed survey mission for its respective first sector, the programmed survey mission for each UAV comprising:
the UAV departing from a first docking station;
the UAV following its programmed flight path along its first sector of the area of interest;
the UAV using sensors to gather sensor data along the UAV's programmed flight path;
the UAV landing at a terminating docking station; and
the UAV transferring sensor data gathered during the mission;
wherein, as a result of the plurality of UAVs each surveying a different sector of the area of interest, the area of interest is surveyed by the combined operations of the plurality of UAVs;
wherein the method further comprises a process for replacing a UAV of the fleet, the process for replacing a UAV of the fleet comprising:
a system controller identifying a UAV of the fleet of UAVs that is lost, damaged or otherwise required to be replaced;
the system controller determining a current docking station for the identified UAV of the fleet;
the system controller determining a replacement path, wherein the replacement path is a path determined within a matrix of docking stations and its determination is based on an initial docking station having a source of operational UAVs and a minimum path length between that initial docking station and the determined docking station; and
the system controller initiating one or more flights of operational UAVs in the fleet to shift existing operational UAVs along the replacement path to provide an operational UAV at the determined docking station.

23. The method of claim 22, further comprising a UAV of the plurality of UAVs performing subsequent survey missions such that the UAV traverses the area of interest from one docking station to a next docking station for each subsequent mission until the UAV reaches a system exit point.

* * * * *